United States Patent [19]

Smedlund

[11] Patent Number: 5,746,324
[45] Date of Patent: May 5, 1998

[54] REFUSE SORTING DEVICE FOR REFUSE STORAGE ROOMS

[75] Inventor: Lars Smedlund, Starrkärr, Sweden

[73] Assignee: Smedlund Miljösystem Ab, Odsmal, Sweden

[21] Appl. No.: 525,738

[22] PCT Filed: Mar. 24, 1994

[86] PCT No.: PCT/SE94/00259

§ 371 Date: Sep. 25, 1995

§ 102(e) Date: Sep. 25, 1995

[87] PCT Pub. No.: WO94/21390

PCT Pub. Date: Sep. 29, 1994

[30] Foreign Application Priority Data

Mar. 24, 1993 [SE] Sweden ................... 9300968

[51] Int. Cl.$^6$ ........................ B07C 7/04; B65D 91/00
[52] U.S. Cl. .................. 209/705; 209/919; 209/930; 232/43.1; 232/43.5; 220/531; 220/909
[58] Field of Search ..................... 209/702, 705, 209/706, 911, 919, 930; 232/43.1, 43.2, 43.5, 44; 220/529, 530, 531, 909

[56] References Cited

U.S. PATENT DOCUMENTS

| | | | |
|---|---|---|---|
| 5,031,829 | 7/1991 | Shantzis | 209/706 X |
| 5,257,577 | 11/1993 | Clark | 209/930 X |

FOREIGN PATENT DOCUMENTS

| | | |
|---|---|---|
| 3933777 | 4/1991 | Germany . |
| 388182 | 6/1975 | Sweden . |

Primary Examiner—Tuan Nguyen
Attorney, Agent, or Firm—Cushman Darby & Cushman IP Group of Pillsbury Madison & Sutro LLP

[57] ABSTRACT

A refuse-sorting device for use at the base of a building's refuse chute, for aiding in category-sorting of refuse. The device includes an open-topped container which is fitted with an openable bottom element. The container is supported for disposition under the discharge opening of a reuse chute, but for being shifted in a horizontal direction into overlying relation with any one of a plurality of upwardly open refuse bin. The device includes a first detector for detecting that refuse is falling into the container, and a second detector, for indicating that the container has completed shifting into overlying relation to a refuse bin designated for reception of the category of refuse contained in the container.

7 Claims, 3 Drawing Sheets

1

REFUSE SORTING DEVICE FOR REFUSE STORAGE ROOMS

BACKGROUND OF THE INVENTION

The subject invention concerns a refuse sorting device to separate refuse and waste being discharged from a refuse chute.

For environmental reasons it has become increasingly urgent in recent years to separate refuse into various categories in order to facilitate the refuse handling, e.g. for recirculation and reclamation. In multistorey buildings equipped with a refuse chute that passes through all the building floors, it has been the practice for several years to use, instead of one single dust bin positioned at the refuse chute mouth in the refuse storage room, a device known as a dust bin shifter or "carousel". The latter device comprises a number of bin bag holders that are arranged to be displaced about a common centre. As the dust bin shifter is rotated one dust bin holder at a time is turned into position underneath the refuse chute mouth for exchange of a filled bag and an empty one.

When a dust bin shifter of this kind is used for category-collection of refuse it has been found to entail not negligible drawbacks. For instance, when a person on one floor of the building wants to throw category-sorted refuse intended for a particular bin bag in the refuse storage room down the chute he or she has to press a button on a keyboard beside the refuse-chute door and wait for the go-ahead signal which will only be emitted when the dust bin shifter has turned to the position wherein the selected bag is presented underneath the chute mouth. More often than not, the necessity to have to wait for the go-ahead as irritating. One consequence often is a diminishing interest for strict category-sorting of refuse.

The term "dust bin" as used herein is intended to be synonymous with refuse container, garbage can or the like.

SUMMARY OF THE INVENTION

The subject invention provides a simple and practical device which highly facilitates category-sorting of refuse and which is extremely reliable.

BRIEF DESCRIPTION OF THE DRAWINGS

The invention will be described in closer detail in the following with reference to the accompanying drawings, wherein.

DETAILED DESCRIPTION

Figure 1:
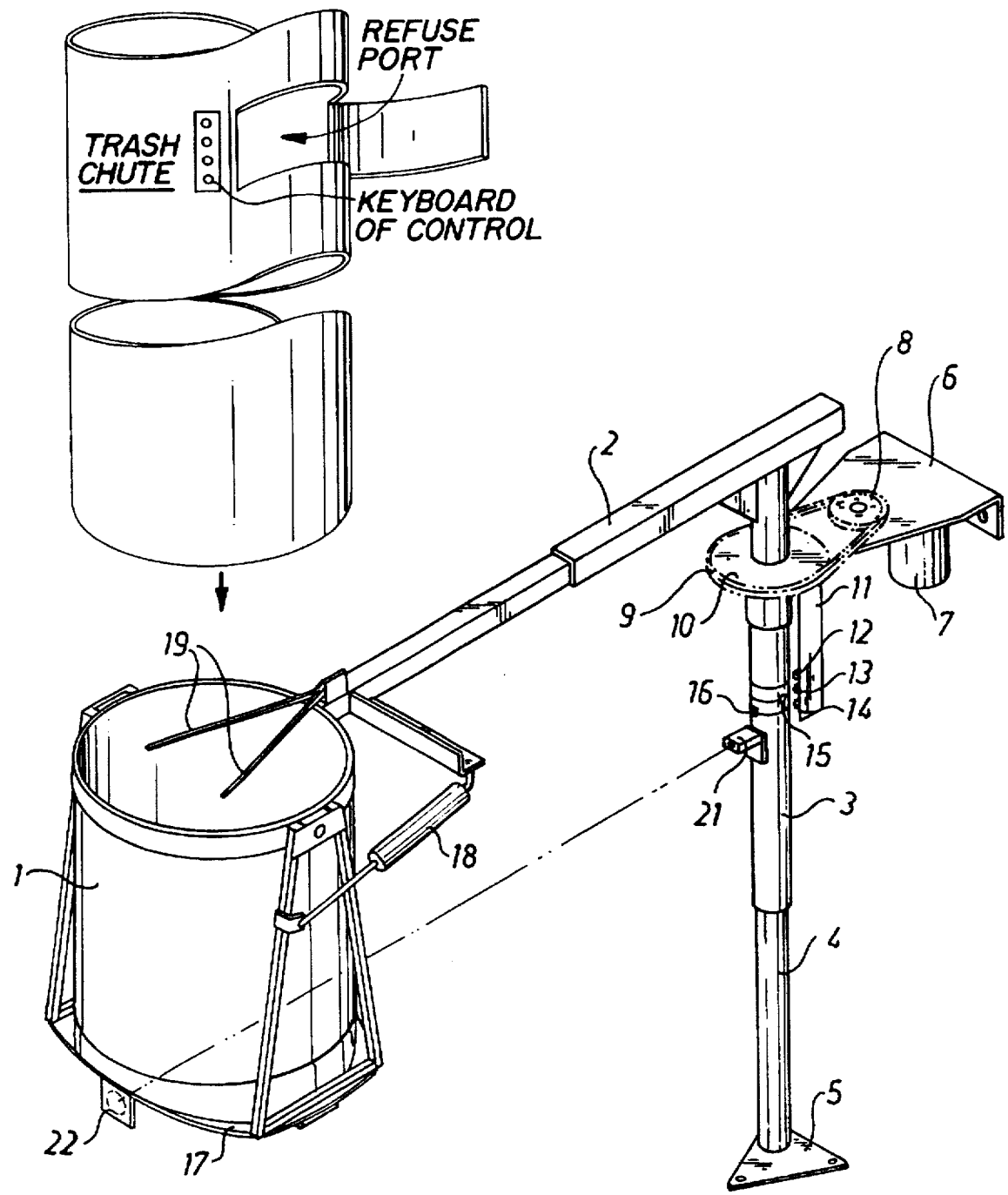
FIG. 1 is a perspective view of the refuse sorting device in accordance with the invention.
Figure 2:
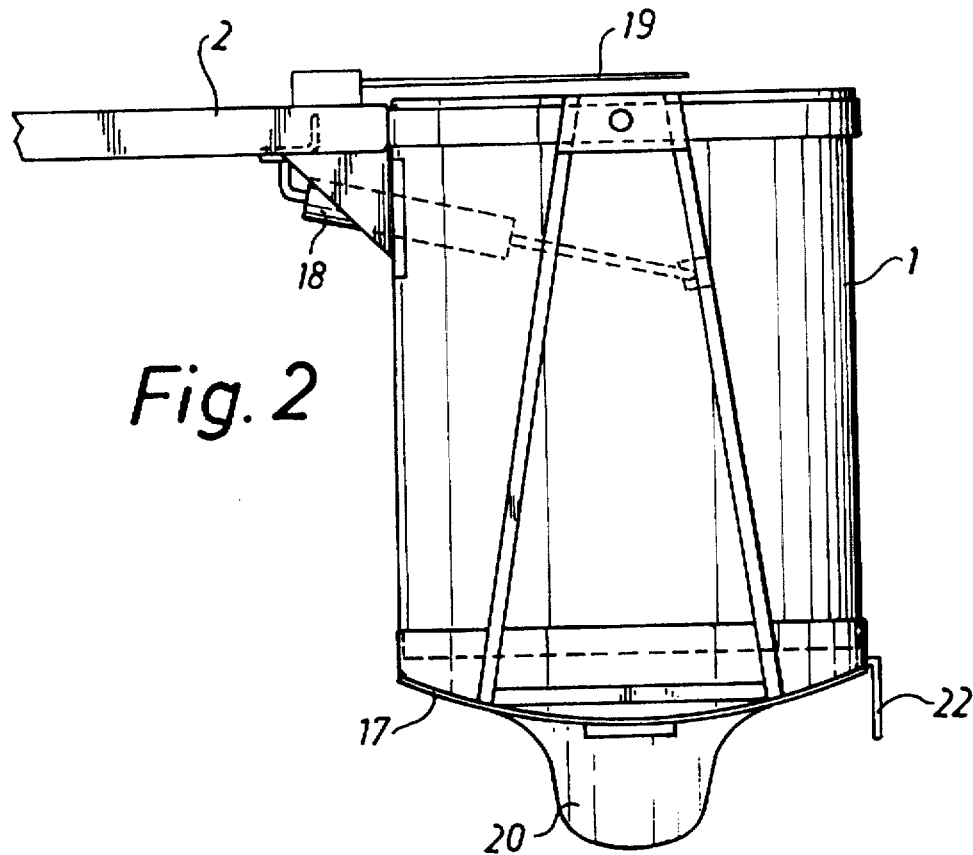
FIGS. 2 and 3 are side views of a container incorporated in the device respectively in closed and open positions.

The principal component of the device is a container 1 which in accordance with the embodiment to be described in the following is attached to the outer end of a horizontal arm 2. The latter is mounted at the upper end of a movable member 3 of a pillar which by means of a stationary piller member 4 is permanently secured to a support by means of a floor fitting 5. At its upper end the pillar 3, 4 is fitted with a wall attachment 6. The latter supports an electric motor 7. A drive mechanism, which may consist of a chain drive 8, a chain 9 and a sprocket wheel 10 which is securely attached to the movable member 3 of the pillar, is programme-controlled to turn the arm 2 and the container 1 into a position above the selected one of a number of dust bins A, B and K (see FIG. 4). Position transducers 12, 13, 14, 15 and 16 are arranged on the movable member 3 of the pillar and a on a bracket 11 externally thereof in order to bring about these controlled arm turning movements.

The container 1 is an open-top container and at its bottom it is provided with a bottom disc 17, the position of which may be shifted by means of a positioning means 18. The arm 2 preferably is telescopically prolongable for adjustment of the position of the container 1 above a dust bin A, B, K. At its upper rim the container 1 is fitted with an indicting means 19 in the form of a two-prong feeler for detection of refuse being discharged into the container 1.

Figure 3:
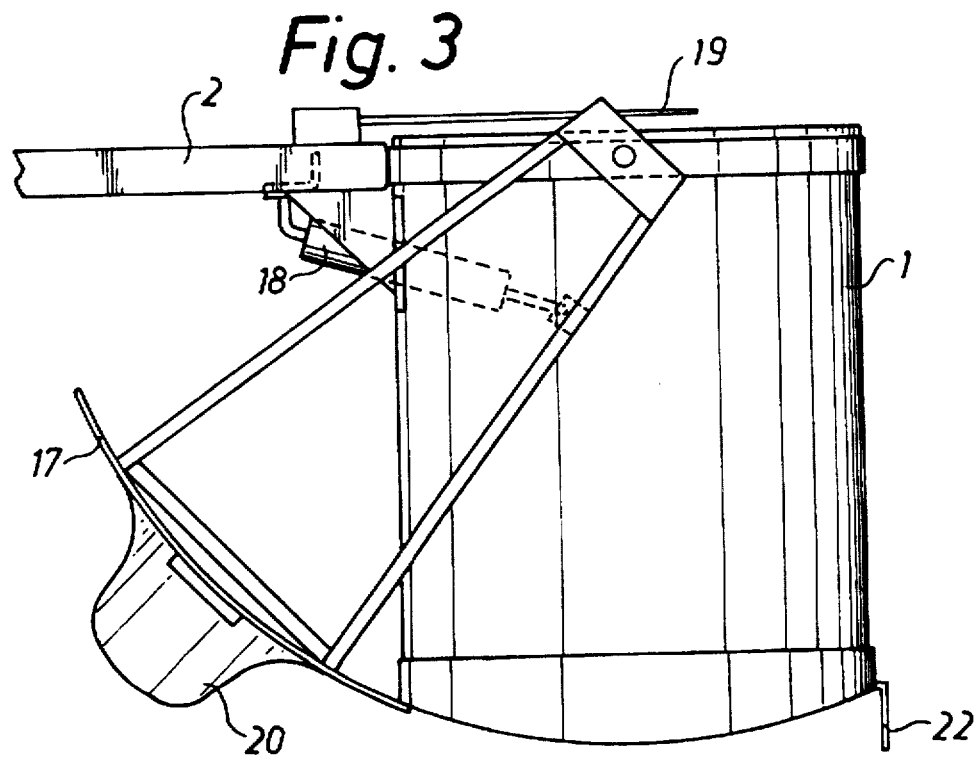

The basic position of the container 1 always is directly underneath a chute mouth. However, the number of dust bins A, B, K may be varied as may also the extent of refuse sorting. In accordance with the embodiment illustrated in FIG. 4, it is assumed that the dust bin A is intended for unsorted refuse, dust bin B for combustible material and dust bin K for composting material. In accordance with the embodiment, the container 1 is positioned above dust bin A with its bottom element in the open swung-away position, as appears from FIG. 3. When a person wishes to get rid of unsorted refuse he or she thus need only open the refuse-chute door on his or her floor, and throw the refuse down the chute. The refuse then passes from the chute straight down, through the container 1 and into the dust bin A. When, on the other hand he or she wishes to get rid of sorted, combustible material, he or she first presses a button marked B on a keyborad at the side of the chute door and then he or she may throw the refuse down the chute straight away. As he or she presses the button a signal is emitted to the positioning means 18 which immediately resets the bottom 1. As the refuse is falling down into the container it passes the feeler 19 resulting in an indicating signal to start the arm swinging operation. The arm 2 then swings the container 1 to a position above dust bin B. The position transducers 13, 15 verify that the correct position is obtained and, in addition, emit a signal to the positioning means 18 to displace the container bottom to the open position. The container 1 is then returned to its position above dust bin A. During the return movement the bottom of the container 1 is in the open position.

In case the refuse being thrown down the chute into the container 1 fails to activate the feeler 19 upon its passage, the container 1 will nonetheless start to shift its position after a certain delay, say 15 to 20 seconds in accordance with a preset programme.

In accordance with an alternative embodiment, the composting bin K is the one positioned underneath the container when the latter assumes its basic position. In this case, the bottom of the container 1 is closed but opens as a button K on the keyboard next to the refuse-chute door on any floor is pressed. Composting refuse passes the feeler member 19 without, in this case, activating the latter to give an impulse for initiating shifting of the container position. Instead, an indication is again given to close the bottom of the container 1.

Figure 4:
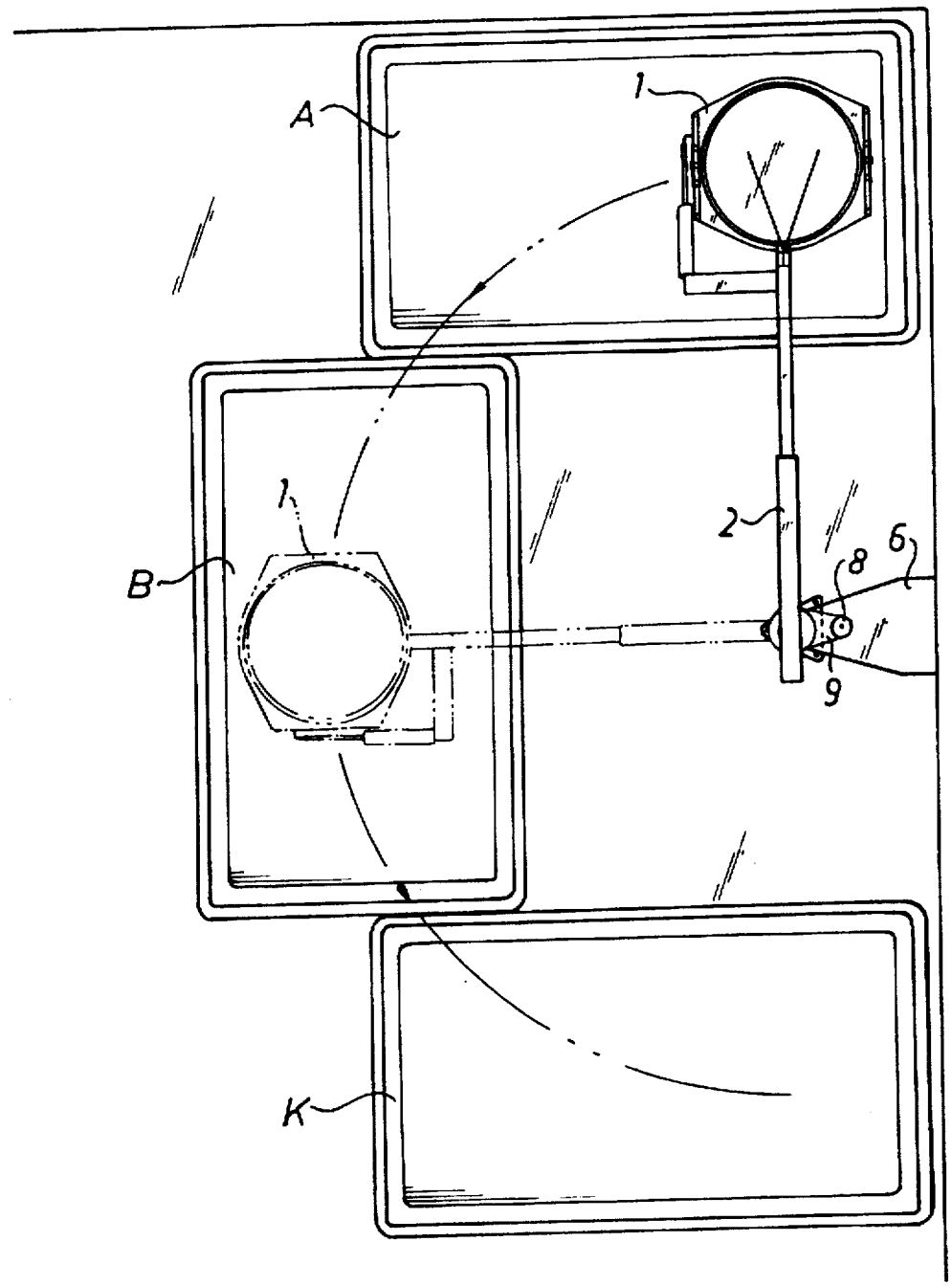
FIG. 4 is a view from above of the device in position above some dust bins.

Should unsorted refuse be thrown down the refuse chute without any button being pressed beforehand the feeler 19 will detect the passage of the refuse and give an impulse to shift the container 1 to the position above dust bin A which, in this case, is assumed to have changed position with bin K in FIG. 4. The position transducers 14, 16 indicate stop and opening of the bottom of the container 1. In response to the programme control, the bottom member 17 is moved to its container-bottom closing position as the container is returning to its basic position.

In accordance with the embodiment illustrated in the drawing figures, the disc-like bottom element 17 of the container 1 is fitted with a scraper 20. Upon swinging movement of the container 1, as appears from FIG. 4, when the container is displaced across a dust bin A, B and K, the scraper 20 functions to exert a scraping action on any projecting heaps of refuse in any one bin, for the purpose of spreading and levelling the refuse inside the bin, to improve the loading capacity of the latter.

The device preferably also includes photoelectric cell equipment 21, 22, by means of which it becomes possible to sense when a dust bin A, B or K is filled. When a bin is filled, this condition may be indicated, for instance by means of the lighting of a lamp outside the refuse storage room and/or a signal being emitted to the caretaker's office. Preferably, the entrance of personnel into the refuse storage room, e.g. to collect filled dust bins, is detected, for instance by means of IR-operated means. Upon detecting of such presence, a signal is given to the positioning means 18 to pivot the bottom disc 17 to the closed position (when the container 1 is open in its basic position), and a corresponding indication signal is emitted at each chute door and in the caretaker's office (lit-up lamp).

The primary advantage of the device in accordance with the invention is that it is extremely convenient to use. A person who intends to dispose of garbage by throwing it down a refuse chute never has to wait by the chute door for the go-ahead signal. Instead, he or she can either throw the garbage straight down the chute or else first press a button and then immediately thereafter throw the garbage down the chute. The refuse either falls straight from the chute mouth, through the container 1 and into a dust bin, or else the refuse is caught in the container 1 and is transport takes place after the person has moved away from the chute door.

The considerable movability of the container 1 makes the handling system very flexible. There is no restriction to a certain type or size of dust bin that may be used. The bins could for instance be a few large-size stationary vessels as illustrated in the drawings, or else consist of a long row of bag holders in which bin bags of paper or plastics material are mounted.

The invention is not either limited to the embodiment described in the aforegoing and illustrated in the drawings but may be varied in many ways within the scope of the appended claims. The bins A, B and K could be placed in a row, one after the other, and the arm 2 be a telescopic arm the extension and retraction motions of which are programme-controlled to shift the container into position above the appropriate one of bins A, B, K.

In accordance with another embodiment, the container 1 may be mounted on a rail suspended from the refuse storage room ceiling or mounted on one of the room walls to serve as a support and guide rail for shifting the container 1 from one bin to the other. The container 1 could also be displaceable on leg-supported rails.

I claim:

1. A device for sorting refuse discharging from the bottom end of a vertical refuse chute having refuse introducing ports at one of more upper levels, and terminating in a refuse storage room in which a plurality of upwardly opening refuse bins are arranged at respective sites in a horizontally extending array, said device comprising:

an upwardly open container having an openable-closable bottom;

a support supporting said upwardly open container for movement to each of a plurality of positions, in one of which said upwardly open container is positioned to receive a lot of refuse which has been introduced into said refuse chute through one of said refuse ports and is discharging from the bottom end of the refuse chute, and in each of a plurality of which said container is stationed over a respective said site, for facilitating discharging of a lot of refuse disposed in the said container, downwardly into a respective underlying refuse bin;

a first detector associated with said container and arranged to detect the falling of a lot of refuse into said container from said bottom end of the refuse chute;

a motor operatively associated with said support and said container, for moving said container to respective selected ones of said positions;

a second detector operatively associated with said container and arranged to detect that said container has become disposed in a presently selected one of said positions; and a control operatively associated with said motor and arranged for receiving as import a selection of one of said positions.

2. The device of claim 1, wherein:

said first detector is operatively associated with said motor, for initiating movement of said container from an existing position to a respective selected position upon detection that a lot of refuse has fallen into said container.

3. The device of claim 1, wherein:

said operable-closable bottom of said container is arranged to be normally open when said container is disposed in said one position; and said control is arranged to cause closing of said bottom of said container in response to selection of a position which is different from said one position, so that a lot of refuse then introduced into said refuse chute and falling into said container will become supported in said container for shifting therewith to said respective position.

4. The device of claim 1, wherein:

said operable-closable bottom is a disc hinged to a body of said container, for swinging between being open and being closed in relation to the container body.

5. The device of claim 4, wherein:

said disk further includes a scraper arranged to move in refuse-leveling contact with refuse in at least one of the refuse bins during movement of said container between respective ones of said positions thereof.

6. The device of claim 1, wherein:

said support includes a horizontal arm having said container mounted to an outer end thereof and a pillar mounting an inner end of said horizontal arm; said inner end of said horizontal arm being mounted to said pillar for swinging movement about a vertical axis.

7. The device of claim 1, wherein:

said support includes a horizontal arm having said container mounted to an outer end thereof and a pillar mounting an inner end of said horizontal arm; said horizontal arm being telescopically extensible and retractable for moving said container to said selected positions.

* * * * *